(12) United States Patent
Kaltenbach et al.

(10) Patent No.: US 8,328,681 B2
(45) Date of Patent: Dec. 11, 2012

(54) METHOD FOR OPERATING A DRIVE TRAIN

(75) Inventors: Johannes Kaltenbach, Friedrichshafen (DE); Stefan Wallner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 320 days.

(21) Appl. No.: 12/677,149

(22) PCT Filed: Sep. 16, 2008

(86) PCT No.: PCT/EP2008/062273
§ 371 (c)(1),
(2), (4) Date: Mar. 9, 2010

(87) PCT Pub. No.: WO2009/037238
PCT Pub. Date: Mar. 26, 2009

(65) Prior Publication Data
US 2010/0197451 A1      Aug. 5, 2010

(30) Foreign Application Priority Data

Sep. 22, 2007   (DE) .......................... 10 2007 045 367

(51) Int. Cl.
*B60W 10/08* (2006.01)
(52) U.S. Cl. .......................................................... 477/5
(58) Field of Classification Search . 477/5; 180/65.265, 180/65.28
See application file for complete search history.

(56) References Cited

U.S. PATENT DOCUMENTS

| | | | |
|---|---|---|---|
| 6,077,186 A | 6/2000 | Kojima et al. | |
| 6,543,561 B1 | 4/2003 | Pels et al. | |
| 6,997,275 B2 | 2/2006 | Mesiti et al. | |
| 8,123,657 B2 * | 2/2012 | Mittelberger et al. | ............ 477/5 |
| 2005/0155803 A1 * | 7/2005 | Schiele | ......................... 180/65.2 |
| 2005/0221947 A1 | 10/2005 | Mesiti et al. | |
| 2007/0056783 A1 | 3/2007 | Joe et al. | |
| 2007/0095584 A1 * | 5/2007 | Roske et al. | .................. 180/65.2 |
| 2007/0102211 A1 | 5/2007 | Nozaki et al. | |
| 2007/0114082 A1 | 5/2007 | Nozaki et al. | |
| 2007/0227790 A1 * | 10/2007 | Tanishima | .................... 180/65.2 |

(Continued)

FOREIGN PATENT DOCUMENTS

DE        198 14 402 A1    10/1999

(Continued)

OTHER PUBLICATIONS

US 8,182,392, 05/2012, Mittelberger et al. (withdrawn)*

*Primary Examiner* — Sherry Estremsky
*Assistant Examiner* — Lillian Nguyen
(74) *Attorney, Agent, or Firm* — Davis & Bujold, PLLC

(57) ABSTRACT

A method of operating a drive train of a motor vehicle whereby the drive train comprises at least a hybrid drive with a combustion engine and an electric motor, a transmission, positioned between the hybrid drive and an output, and a clutch, positioned between the combustion engine and the electric motor. When the electric motor is exclusively driving, the combustion engine can be started by engaging a clutch positioned between the combustion engine and the electric motor. In accordance with the invention, when there is an exclusive electromotive drive and the electric motor is operated in a deceleration mode and, when a request by a driver is interpreted as a desired change from a deceleration mode to a traction mode, the combustion engine is started, by using the deceleration/traction change, in a way that the clutch, positioned between the combustion engine and the electric motor, is at least partially engaged so that the clutch transfers the required torque which is needed for starting the combustion engine.

9 Claims, 1 Drawing Sheet

U.S. PATENT DOCUMENTS

| | | | |
|---|---|---|---|
| 2007/0259755 A1 * | 11/2007 | Tanishima | 477/3 |
| 2007/0278022 A1 * | 12/2007 | Tanishima | 180/65.2 |
| 2008/0064560 A1 * | 3/2008 | Popp et al. | 477/5 |
| 2008/0195266 A1 | 8/2008 | Le Neindre et al. | |
| 2008/0245332 A1 * | 10/2008 | Rimaux et al. | 123/179.24 |
| 2009/0017988 A1 * | 1/2009 | Reuschel | 477/167 |
| 2009/0124452 A1 | 5/2009 | Fuechtner et al. | |
| 2009/0181821 A1 * | 7/2009 | Henneken et al. | 477/5 |
| 2009/0264249 A1 * | 10/2009 | Gloge | 477/3 |
| 2010/0056328 A1 | 3/2010 | Schenk et al. | |

FOREIGN PATENT DOCUMENTS

| | | |
|---|---|---|
| DE | 102 60 435 A1 | 7/2004 |
| DE | 103 27 306 A1 | 1/2005 |
| DE | 10 2006 048 358 A1 | 4/2008 |
| DE | 10 2006 049 888 A1 | 4/2008 |
| DE | 10 2007 001 424 A1 | 7/2008 |
| EP | 0 922 600 A2 | 6/1999 |
| EP | 1 785 305 A2 | 5/2007 |
| FR | 2 882 697 A1 | 3/2005 |
| WO | 01/56824 A1 | 8/2001 |
| WO | 2004/111441 A1 | 12/2004 |
| WO | 2007/045785 A1 | 4/2007 |
| WO | WO 2007045785 A1 * | 4/2007 |
| WO | 2008/049662 A1 | 5/2008 |

\* cited by examiner

METHOD FOR OPERATING A DRIVE TRAIN

This application is a National Stage completion of PCT/EP2008/062273 filed Sep. 16, 2008, which claims priority from German patent application serial no. 10 2007 045 367.3 filed Sep. 22, 2007.

FIELD OF THE INVENTION

The invention relates to a method for operating a drive train of a motor vehicle, comprising at least one transmission and one hybrid drive.

BACKGROUND OF THE INVENTION

The main components of a drive train in a motor vehicle are a drive unit and a transmission. A transmission converts torque and rotation speed, and hereby converts the available traction force of the drive unit. This present invention relates to the operating of a drive train which has at least one transmission and one hybrid drive as drive unit.

A method for operating an automatic transmission and a hybrid drive of a motor vehicle is known by US 2005/0221947 A1 whereby, on one hand, a clutch is positioned between a combustion engine of the hybrid drive and an electric motor of the hybrid drive and, on the other hand, an additional clutch is positioned between the electric motor and the automatic transmission. At the time, when the drive train is driven exclusively by the electric motor of the hybrid drive, the combustion engine of the hybrid drive, in accordance with the state of the art, can be started in a way that, during the execution of an upshift by the automatic transmission of the drive train, the clutch, positioned between the combustion engine of the hybrid drive and the electric motor, is engaged. In accordance with US 2005/0221947 A1, the electric motor of the hybrid drive hereby serves to start the combustion engine of the hybrid drive, whereby the start of the combustion engine takes place during the execution of an art shift, thus at interrupting the traction force. The start of the combustion engine, during the execution of an upshift, can lead to a reduction of the driving comfort.

SUMMARY OF THE INVENTION

On this basis, the present invention addresses the problem to create a novel method for operating a drive train comprising a transmission and a hybrid drive.

In accordance with the invention and at the time, when the electric motor is operated, during an exclusive electric motor drive, in a deceleration mode and due to a request from the driver, the deceleration mode needs to go to a traction mode, the combustion engine will start, using the deceleration/traction change, in a way that a clutch, positioned between the combustion engine and the electric motor, is at least partially engaging so that the clutch transfers the torque necessary to start the combustion engine.

Thus, the inventive method proposes that, when the combustion engine is turned off and the electric motor operates in an electric brake mode and therefore in a so called recuperation mode, and if during this recuperation operation a driver request for a desired change from a deceleration mode to a traction mode is recognized, the combustion engine will be started by using the deceleration/traction change.

Thus, starting of the combustion engine is processed as a reaction to a request from the driver so that the combustion engine, from the driver standpoint, does not start surprisingly and at starting of the combustion engine is not felt as an uncomfortable experience.

In another advantageous embodiment of the invention, the combustion engine is started in a way using the change of deceleration and traction, that at the time, when the torque provided by the electric motor is nearly zero, the electric motor gets disengaged from the output to provide an traction interruption, and thereafter the combustion engine is started through at least partial engagement of the clutch, positioned between the combustion engine and the electric motor, and after the start of the combustion engine, the electric motor is linked to the drive output to suspend the traction interruption.

For the purpose of an advantageous embodiment of the invention, starting of the combustion engine takes place by the use of the deceleration/traction together with a deceleration interruption. Despite the traction force interrupt, there is almost no reduction of the drive comfort because the phase, needed to start the combustion engine and in which the present torque almost equals zero, is only extended, without the necessity of a prior load decrease. This traction force interrupt for starting of the combustion engine, by using the change in deceleration/traction, occurs faster than a traction force interrupted for starting of the combustion engine without the use of the deceleration/traction change because, as already mentioned, no prior load reduction becomes necessary. Because starting of the combustion engine, at traction force interruption, does not affect the output of the drive train, the sequence of starting of the combustion engine can be easily tuned.

BRIEF DESCRIPTION OF THE DRAWINGS

Preferred advancements of the invention are presented in the dependent claims and the description below. Examples of embodiments of this invention, without being limited to them, are further explained through the drawings. It shows:

DETAILED DESCRIPTION OF THE PREFERRED EMBODIMENTS

Figure 1:
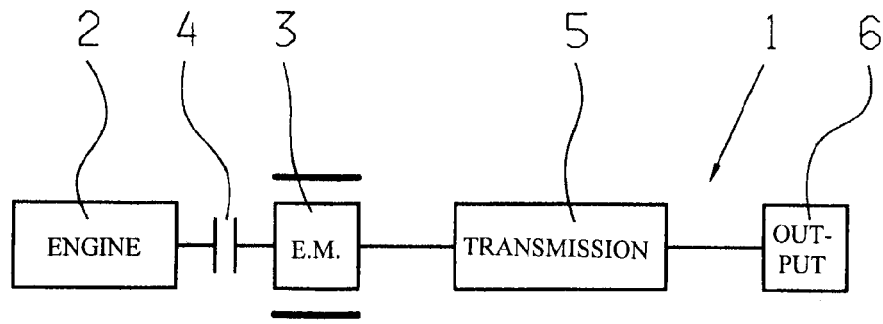
FIG. 1 a first drive train schematic for a motor vehicle in which the inventive method can be applied.
Figure 2:
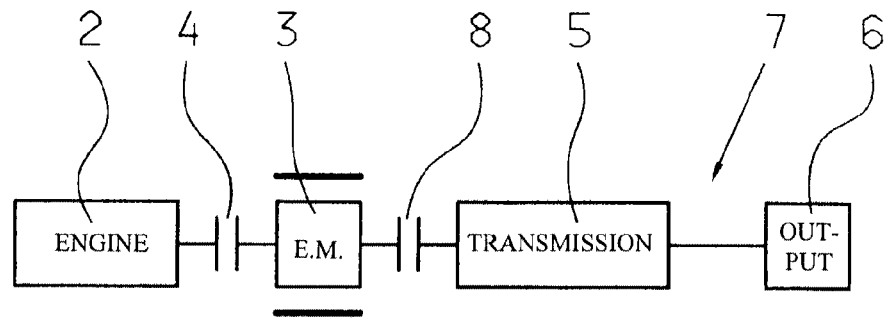
FIG. 2 a second drive train schematic for a motor vehicle in which the inventive method can be applied.

The present invention relates to a method for operating a drive train of a motor vehicle comprising at least one transmission and one hybrid drive. A hybrid drive comprises a combustion engine and an electric motor. FIGS. 1 to 2 show exemplarily drive schematics for a motor vehicle in which the inventive method can be used.

FIG. 1 shows a schematic of a drive train 1 of a motor vehicle whereby the drive train 1, in accordance with FIG. 1, comprises a hybrid drive which is formed by a combustion engine 2 and an electric motor 3. Between the combustion engine 2 and the electric motor 3, a clutch 4 is positioned which is not engaged, at the time when the drive train 1 is exclusively driven by the electric motor 3. Beside the hybrid drive, the drive train 1, in accordance with FIG. 1, also comprises a transmission 5 which transfers the available traction force, which is provided by the hybrid drive, to an output 6 of the drive train, in particular the wheels. Another schematic of a drive train 7 of a motor vehicle is shown in FIG. 2, whereby the drive train in FIG. 2 differs from the drive train in FIG. 1 by the fact that a clutch 8 is positioned between the electric motor 3 of the hybrid drive and the transmission 5.

If a drive train, in accordance with FIG. 1 or 2, is driven exclusively by the electric motor 3 of the hybrid drive with a disengaged clutch 4, under certain operating conditions it might be required to start the combustion engine 2 of the hybrid drive.

Based on this present invention, starting of the combustion engine 2 takes place by using the deceleration/traction change of the drive train. At the time when the combustion engine 2 is turned off and the drive train is exclusively, electromotive driven by the electric motor 3 and in a deceleration mode, and an acknowledged request from the driver which is interpreted as a change from a deceleration to a traction mode, the combustion engine 2 is started in a way by using the deceleration/traction change that the clutch 4, positioned between the combustion engine 2 and the electric motor 3, is at least partially engaged in a way so that the clutch transfers the torque, which is required to start the combustion engine 2. Based on the present invention, at the time of a turned off combustion engine 2, during deceleration when the electric motor 3 electrically brakes and thus operates in the deceleration mode or the so-called recuperation mode, respectively, when there is a request to change from the deceleration operation to the traction operation the combustion engine 2 is started.

The determination of the request on the driver, from which the requested change from the deceleration mode into the traction mode occurs, in particular, by a brake pedal activation and/or a gas pedal activation by the driver and is independent of the actual traction of a vehicle. At the time, during a braking deceleration operation or a recuperation operation of the electric motor 3, respectively, and a turned off combustion engine 2, when a requested deceleration/traction change is derived from the request of the driver, starting of the combustion engine 2 takes place in accordance with the invention.

Preferably, the combustion engine 2 is started by using the deceleration/traction change in a way and at the time when the available torque provided by the electric motor 3 for the drive train or output 6, respectively, is almost zero, the electric motor 3 is de-coupled from the output by providing an traction interruption.

Thereafter, during the interrupted traction, the combustion engine 2 is started by at least a partial engagement of the clutch 4 positioned between the combustion engine 2 and the electric motor 3. After starting of the combustion engine 2, the electric motor 3 is coupled to the output 6 by the termination of the traction interruption.

As shown in FIG. 1, at the time when there is no clutch positioned between the electric motor 3 and the transmission 5, the electric motor 3 is de-coupled from the output 6, by setting the transmission 5 into a neutral gear shift position, to provide the traction interruption to execute the inventive method. Hereafter, the combustion engine 2 is started by at least a partial engagement of the clutch 4, positioned the between combustion engine 2 and the electric motor 3, whereby after starting of the combustion engine 2, the electric motor 3 is coupled to the output by shifting a gear in the transmission 5 and termination of the traction interruption.

In the above case, in which the drive train as in FIG. 1 does not comprise a clutch between the electric motor 3 and the transmission 5, the clutch 4, positioned between the combustion engine 2 and the electric motor 3, can either remain engaged or also be disengaged.

When the clutch 4 remains engaged, at the time and after starting of the combustion engine 2, the clutch 4, positioned between the combustion engine 2 and the electric motor 3, is engaged at the time of the termination of the traction interruption, whereby at that time, by a gear shift in transmission 5 the electric motor 3 and the combustion engine 2 synchronize together and are together coupled to the output 6.

However, and at the time, when at an interrupted traction and after the start of the combustion engine 2 the clutch, positioned between the combustion engine 2 and the electric motor 3, disengages, the clutch, positioned between the combustion engine 2 and the electric motor 3, is disengaged so that only the electric motor 3 synchronizes during a gear shift of the transmission 5. Only after a gear shift of the transmission 5 and only in that case is the clutch, positioned between the combustion engine 2 and the electric motor 3, engaged thus the electric motor 3 and the combustion engine 2, in that case, are time delayed coupled to the output 6.

In the embodiment of FIG. 2, in which a clutch 8 is positioned between the electric motor 3 and the transmission 5, to execute the inventive method and at the point of time when the provided torque of the electric motor 3 at the drive train or output 6, respectively, is approximately zero, by disengaging the clutch 8, positioned between the electric motor 3 and the transmission 5, the electric motor 3 is decoupled from the output 6 to provide the traction interruption. Thereafter, the combustion engine 2 is started by engagement of clutch 4, positioned between the combustion engine 2 and the electric motor 3, whereby this clutch 4 remains engaged after starting of the combustion engine 2. Next, after starting of the combustion engine 2, the electric motor 3 together with the combustion engine 2 are coupled to the output 6, by engaging the clutch 8 positioned between the electric motor 3 and the transmission 5, through termination of the traction interruption. Thus, during termination of the traction interruption, the clutch 4, positioned between the combustion engine 2 and the electric motor 3, is engaged. In this case, the electric motor 3 and the combustion engine 2 are coupled together with the output 6, via the clutch 8, positioned between the electric motor 3 and the transmission 5.

Figure 3:
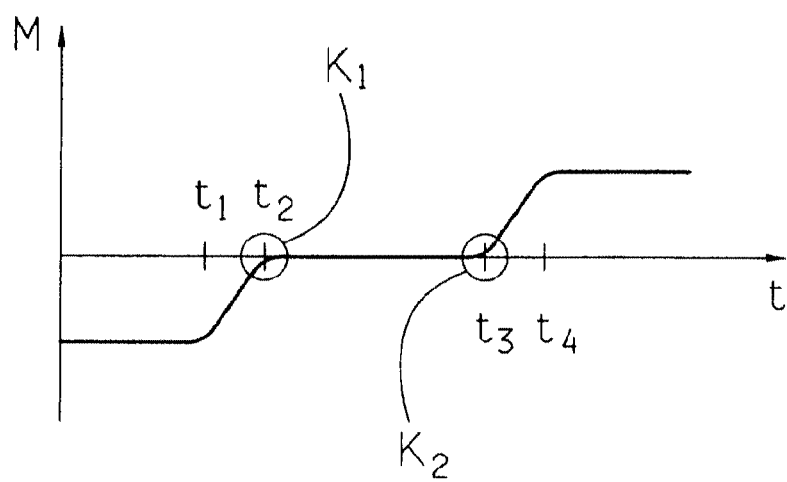
FIG. 3 a diagram for the clarification of a preferred embodiment of the inventive method for operating a drive train of a motor vehicle.

In accordance with a preferred embodiment of the invention, in which starting of the combustion engine 2, when the electric motor 3 operates in the recuperation mode, by use of the deceleration/traction change and which takes place by providing the traction interruption, as shown in the FIG. 3, this results in a drive torque M at the output 6 of the drive train over the time t. Up to time $t_1$, the drive train is exclusively operated electromotive by the electric motor 3, during a turned off combustion engine 2, in a braking deceleration, and thus in the recuperation mode, whereby at time $t_1$ and due to a request of the driver, the desired change from the deceleration mode into the traction mode takes place. Starting at time $t_1$, the deceleration torque, provided by the electric motor 3 to the output 6 is continuously reduced whereby, at time $t_2$, the provided torque of the electric motor 3 to the output 6 is approximately zero. Then, the electric motor 3 is decoupled from the output 6 so that hereby the traction interruption is provided, whereby during the traction interruption the combustion engine 2 can be started via a partial engagement of clutch 4. After starting of the combustion engine 2, at time $t_3$ and by coupling of the electric motor 3 to the output 6, the traction interruption is terminated whereby the traction interruption is terminated at the time $t_4$, and, by providing a hybrid drive, the combustion engine 2 as well as the electric motor 3 are coupled to the output 6 to drive the same in the traction mode.

The starting of the combustion engine, when changing from the deceleration mode into the traction mode, thus takes place when the torque provided to the output 6 is approximately zero, whereby the method is applied when a desired deceleration/traction change derives from a request by the driver. Thus, starting of the combustion engine follows the request of the driver and is initiated by a reaction of the driver.

As FIG. 3 illustrates by circle K1 and prior to providing the traction interruption, the electric motor 3 is controlled in a way that the gradient of the reduction of the traction torque M continuously reduces itself until the provided torque of the electric motor 3, to the output 6, is approximately zero. In accordance with the circle K2, after the starting of the combustion engine 2 and after the termination of the traction interruption, the electric motor 3 and, if necessary, also the combustion engine 2, are controlled in a way that the gradient of the traction torque increase continuously gets larger. Hereby, the comfort can be increased when the combustion engine 2 is started.

It is assumed in the above description of the invention and in reference to FIGS. 1 and 2 that, at the time when the combustion engine 2 is turned off and the electric motor 3 is operating in the recuperation mode and when a desired deceleration/traction change derives from the request of the driver, the combustion engine 2 is started by providing a traction interruption. In contrast, it is also possible to start the combustion engine 2 without a traction interruption, under the conditions of a recuperation operation of the electric motor 3 and a derived deceleration/traction change, due to the request of the driver, at that time when the electric motor 3 continuously drives the output 6 of the respective drive train.

In this case, the rotation speed of the electric motor 3 needs to be greater than a starting rotational speed of the combustion engine, whereby, to start the combustion engine 2, the clutch 4, positioned between the combustion engine 2 and the electric motor 3, is brought into slippage, via partial engagement, for starting the combustion engine 2, and whereby hereafter the clutch 4 again becomes completely disengaged, meaning before reaching a synchronous rotational speed between the combustion engine 2 and the electric motor 3.

REFERENCE CHARACTERS

1 Drive Train
2 Combustion Engine
3 Electric Motor
4 Clutch
5 Transmission
6 Output
7 Drive Train
8 Clutch

The invention claimed is:

1. A method of operating of a drive train of a motor vehicle, whereby the drive train comprises at least a hybrid drive with a combustion engine and an electric motor, a transmission which is positioned along the hybrid drive and an output, and a clutch being positioned between the combustion engine and the electric motor, whereby at a time when the electric motor exclusively drives, the combustion engine can be started by engaging the clutch, positioned between the combustion engine and the electric motor, the method comprising the steps of:

initiating the starting of the combustion engine when driving exclusively with the electric motor, while the electric motor is being operated in a deceleration mode, and upon obtaining a request by the driver which is interpreted as a desired change from a deceleration mode to a traction mode, and starting the combustion engine, while changing from the deceleration mode to the traction mode, by at least partially engaging the clutch, positioned between the combustion engine and the electric motor, such that the clutch transfers a required torque for starting the combustion engine.

2. The method according to claim 1, further comprising the step of decoupling the electric motor from the output to provide a traction interruption, when the torque which is provided by the electric motor at the drive train, is approximately zero, and after the combustion engine is started by the clutch, positioned between the combustion engine and the electric motor, and after starting of the combustion engine, coupling the electric motor to the output to terminate the traction interruption.

3. The method according to claim 2, further comprising the step of decoupling the electric motor from the output by disengaging a clutch, positioned between the electric motor and the transmission, and when the torque which is provided by the electric motor at the drive train is approximately zero, to provide the traction interruption, then starting the combustion engine by at least partial engagement of the clutch, positioned between the combustion engine and the electric motor, and subsequently, after starting of the combustion engine, coupling the electric motor to the output by engaging the clutch, positioned between the electric motor and the transmission, to terminate the traction interruption, the clutch, positioned between the combustion engine and the electric motor, is engaged.

4. The method according to claim 2, further comprising the step of, where the drive train does not have a clutch positioned between the electric motor and the transmission, then, when the torque which is provided by the electric motor at the drive train is approximately zero, decoupling the electric motor from the output by shifting the transmission into a neutral shift position to provide the traction force interruption, then starting the combustion engine by at least partially engaging the clutch, positioned between the combustion engine and the electric motor, and then, after starting of the combustion engine, coupling the electric motor to the output by shifting a gear in the transmission to terminate the traction force interruption.

5. The method according to claim 4, further comprising the step of, engaging the clutch, positioned between the combustion engine and the electric motor at termination of the traction force interruption.

6. The method according to claim 4, further comprising the step of, at termination of the traction force interruption, disengaging the clutch, positioned between the combustion engine and the electric motor, whereby, after starting of the combustion engine and before a gear shift in the transmission, disengaging the clutch, positioned between the combustion engine and the electric motor, and engaging the clutch, positioned between the combustion engine and the electric motor, after a gear shift in the transmission.

7. The method according to claim 1, further comprising the step of controlling the electric motor, before providing the traction force interruption, to continuously lower a gradient of a deceleration torque and that, after the termination of the traction force interruption, controlling at least one of the electric motor and the combustion engine the gradient of the deceleration torque continuously increases.

8. The method according to claim 1, further comprising the step of starting the combustion engine, while changing from the deceleration mode to the traction mode such that then, when the electric motor drives either continuously, or without deceleration force interruption, respectively, the output and the rotational speed of the electric motor is greater than a starting rotational speed of the combustion engine, and controlling the clutch, positioned between the combustion engine and the electric motor, during engaging and disengaging such that the clutch, positioned between the combustion engine and the electric motor, through a partial engagement is brought into slippage to start the combustion engine, and thereafter completely disengaging the clutch, positioned between the combustion engine and the electric motor, again before reaching a synchronous rotational speed between the combustion engine and the electric motor.

9. A method of operating a drive train of a motor vehicle, the drive train comprising a hybrid drive with a combustion engine and an electric motor, a transmission and an output, and a clutch being positioned between the combustion engine and the electric motor, the method comprising the steps of:

driving the motor vehicle exclusively with the electric motor, the electric motor operating in a deceleration mode, the clutch being fully disengaged and the combustion engine being static;

detecting a signal which represents a driver request to change from a deceleration mode of vehicle operation to a traction mode vehicle operation;

disengaging the electric motor from the output of the motor vehicle;

starting the combustion engine by partially engaging the clutch to transfer a starting torque from the electric motor to the combustion engine; and engaging the electric motor to the output of the motor vehicle and driving the motor vehicle with at least the combustion engine.

* * * * *